United States Patent [19]

Stadtfeld

[11] Patent Number: 4,952,874
[45] Date of Patent: Aug. 28, 1990

[54] POSITION-READING SYSTEM WITH SWITCHABLE READING UNITS FOR MACHINE-TOOL PARTS ROTATABLE THROUGH 360

[75] Inventor: Hermann Stadtfeld, Dielsdorf, Switzerland

[73] Assignee: Werkzeugmaschinenfabrik Oerlikon-Bührle AG, Zürich, Switzerland

[21] Appl. No.: 374,656

[22] Filed: Jun. 30, 1989

[30] Foreign Application Priority Data

Jul. 7, 1988 [CH] Switzerland ............... 02596/88

[51] Int. Cl.$^5$ .............. G01B 7/30; G01P 13/00; H03M 1/00
[52] U.S. Cl. ............. 324/207.22; 324/207.25; 341/15; 364/559
[58] Field of Search ........... 324/160, 163, 164, 166, 324/173, 174, 202, 208, 207.22, 207.25; 341/15; 235/449, 493; 409/27; 364/559–561, 474.28, 474.29, 474.3, 474.35; 318/653

[56] References Cited

U.S. PATENT DOCUMENTS 3,728,565  4/1973  O'Callaghan ............... 324/164
4,107,601  8/1978  Barmeier, Jr. et al. ....... 324/173
4,587,485  5/1986  Papiernik ................. 324/160 X

FOREIGN PATENT DOCUMENTS 2403854  8/1975  Fed. Rep. of Germany .
2546521  4/1977  Fed. Rep. of Germany .
2086568  5/1982  United Kingdom .

OTHER PUBLICATIONS

Patent Abstracts of Japan, Band 9, Nr. 109 (P-355) (1832), May 14, 1985.

Primary Examiner—Gerard R. Strecker
Attorney, Agent, or Firm—Werner W. Kleeman

[57] ABSTRACT

The position-reading system for machine-tool parts rotatable through 360° renders possible accurate position determination by using a scale although there is present a measuring gap. This is achieved by the use of two reading units angularly offset at a predetermined angle with respect to one another and by the use of an indicating unit which contains evaluation and switch-over means. These evaluation and switch-over means evalute the output signals of the two reading units and switch, on the one hand, one reading unit, upon passage threat of the measuring gap, to become position-reading inactive and, on the other hand, the other reading unit to become position-reading active, such other reading unit taking over the corresponding momentary position value or reading.

6 Claims, 1 Drawing Sheet

POSITION-READING SYSTEM WITH SWITCHABLE READING UNITS FOR MACHINE-TOOL PARTS ROTATABLE THROUGH 360

CROSS-REFERENCE TO RELATED APPLICATIONS

This application is related to the commonly assigned, copending U.S. application Ser. No. 07/381,111, filed July 17, 1989, entitled "APPARATUS FOR AND METHOD OF PRODUCING A GEAR-WHEEL" and U.S. application Ser. No. 07/386,458, filed July 28, 1989, entitled "APPARATUS FOR ADJUSTING THE DRUMS OF A BEVEL-GEAR CUTTING MACHINE".

BACKGROUND OF THE INVENTION

The present invention broadly relates to position-determining devices and, more specifically, pertains to a new and improved position-reading system for machine-tool parts which are rotatable through 360°.

Generally speaking, the position-reading system of the present invention is of the type which comprises a scale unit, a reading unit and an indicating unit.

Known electronic digital-scale systems contain a scale unit, a reading unit and an indicating unit, whereby the scale unit is usually constructed as a linear scale and contains a magnetized scale band. The use of such an electronic digital-scale system as a position-reading system for rotations through 360°, for instance to determine the position of rotatable or pivotable machine parts in machine tools, is fraught with difficulties because the magnetized scale band to be mounted, for example, at a drum or disc possesses a gap or joint which, upon passage thereof in front of the reading unit, delivers or emits an undefined signal with the result that the orientation or the actual position becomes lost.

SUMMARY OF THE INVENTION

Therefore, with the foregoing in mind, it is a primary object of the present invention to provide a new and improved construction of a position-reading system for machine-tool parts rotatable through 360°, and which system does not suffer from the aforementioned drawbacks and shortcomings of the prior art constructions.

Another and more specific object of the present invention aims at providing a new and improved position-reading system which indicates the actual position of a rotatable or pivotable part unaffected by or irrespective of gaps or joints located in the scale unit.

Yet a further significant object of the present invention aims at providing a new and improved construction of a position-reading system of the type described which is relatively simple in construction and design, highly reliable in operation, not readily subject to malfunction and requires only a minimum of maintenance and servicing.

In the context of this disclosure and the claims, the term "rotatable" also encompasses machine parts which are pivotable or oscillatable through predetermined angular positions.

Now to implement these and still further objects of the invention, which will become more readily apparent as the description proceeds, the position-reading system of the present invention is manifested, among other things, by the features that the reading unit defines a first reading unit, the scale unit possesses a gap or joint and is arranged at a rotatable machine part, a further or second reading unit is arranged to be angularly offset by a predetermined angle with respect to the first reading unit, and the indicating unit comprises evaluation and switch-over or switching means. The indicating unit evaluates the output signals of the two reading units and, upon passage of the gap or joint in front of one of the two reading units, the indicating unit switches this one reading unit to become position-reading inactive and the other reading unit to become position-reading active, such other reading unit taking over the actual instantaneous or momentary position value or reading.

A primary advantage of the position-reading system constructed according to the present invention essentially resides in the fact that known or existing scale systems structured for linear or longitudinal measurements also can be used for position determination in case of machine part rotations through 360°, provided that corresponding constructional adaptations and modifications are made.

In a preferred exemplary embodiment of the position-reading system according to the present invention there are arranged at the scale unit at least two readable marks or markings for determining a region or zone of the gap or joint. An additional mark or marking reader is provided for determining the respective switch-over positions of the first and second reading units. The evaluation and switch-over means of the indicating unit preferably comprise a computer.

BRIEF DESCRIPTION OF THE DRAWINGS

The invention will be better understood and objects other than those set forth above will become apparent when consideration is given to the following detailed description thereof. Such description makes reference to the annexed drawings wherein throughout the various figures of the drawings, there have been generally used the same reference characters to denote the same or analogous components and wherein.

DETAILED DESCRIPTION OF THE PREFERRED EMBODIMENTS

Figure 1:
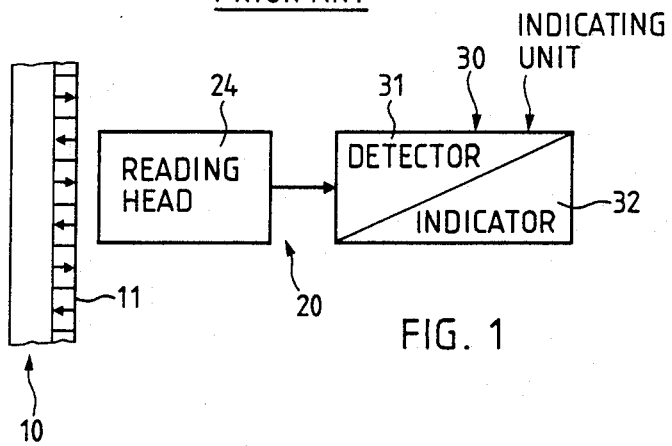
FIG. 1 is a schematic illustration of the construction of a known magnetic-scale system for reading linear or longitudinal positions of a machine part.

Describing now the drawings, it is to be understood that to simplify the showing thereof, only enough of the structure of the exemplary embodiment of the position-reading system has been illustrated therein as is needed to enable one skilled in the art to readily understand the underlying principles and concepts of this invention. Turning attention now specifically to FIG. 1 of the drawings, a known electronic digital magnetic-scale system will be seen to comprise a scale unit 10, a reading unit 20 and an evaluating unit 30, also known as an indicating unit. The scale unit 10 contains a magnetic scale 11 fabricated of a material which possesses a high magnetic resistance. This magnetic scale 11 comprises in a predetermined uniformly spaced relationship scale signals or signal-generating elements each in the form of two magnets with alternating polarity.

A reading head 24 of the reading unit 20 has to be arranged at a relatively small distance or clearance of, for example, 1.5 mm from the magnetic scale 11 and contains two magnetic heads which generate sinusoidal or sine-wave signals. These two magnetic heads are phase shifted by 90° for determining the machine part direction of travel or motion and for interpolation. The following or subsequently connected evaluating or indicating unit 30 essentially contains a detector 31 and an indicator 32.

This known scale system is commercially available from Sony Magnescale Inc. of Tokyo, Japan under its tradename "DIGIRULER" and also can be used for practising the present invention. It operates or functions in standstill as well as during a relative motion between the scale unit 10 and the reading unit 20 in that magnetic field intensities of the scale signals induce strong signals in both magnetic heads of the reading head 24. A thus resulting output signal is transmitted to the detector 31, which output signal is electrically interpolated by the detector 31 and transformed into a signal which is suitable for measuring and other control purposes. It is self-evident that the evaluating or indicating unit 30 contains zeroing or zero-setting functions, reference value functions and pre-setting functions as well as a power supply circuit. Furthermore, an absolute measurement or incremental measurement is selectable.

Figure 2:
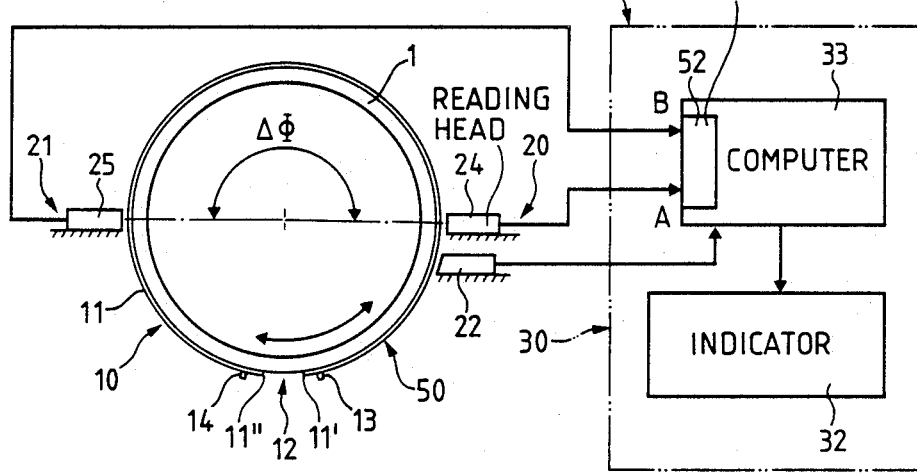
FIG. 2 is a schematic illustration of the construction of an exemplary embodiment of the inventive position-reading system for machine parts which are rotatable through 360°.

An exemplary embodiment of the position-reading system constructed according to the present invention is schematically shown in FIG. 2. A scale unit, for example, the scale unit 10 as depicted in FIG. 1, is here mounted at a drum or cylinder 1, for instance a generating drum of a bevel gear cutting machine, generally indicated by reference numeral 50. This drum or cylinder 1 is pivotable or rotatable through 360° and is schematically shown in a simplified illustration. For the reasons explained previously, it can be simply considered to constitute a "rotatable" drum or cylinder 1.

Between a beginning or starting region 11' and an end or terminal region 11'' of the magnetic scale 11, there is located a measuring gap or joint 12, whereby it is substantially irrelevant whether the beginning or starting region 11' and the end or terminal region 11'' of the magnetic scale 11 directly bear against on another or are separated from each other through an angle smaller than 180°. Furthermore, there are provided two reading units 20 and 21 with reading heads 24 and 25, respectively. These reading units 20 and 21 are fixedly mounted at a suitable machine which is not further shown in the drawings but could be, for example, the aforesaid bevel gear cutting machine 50. As will be readily evident from the showing of FIG. 2, the reading head 25 is arranged to be angularly offset by a predetermined angle $\Delta\phi$ with respect to the reading head 24.

Two magnetic marks or markings 13 and 14 are preferably provided at the scale unit 10. Such marks or markings 13 and 14 can be arranged, for example, on respective or opposite sides and in the proximity of the gap or joint 12. An additional magnetic-marking reader 22 is stationarily provided at the aforesaid machine. Furthermore, the evaluating or indicating unit 30 contains additional evaluation and switch-over means, generally indicated by reference numeral 52, in a computer 33 which is electrically connected with the reading units 20 and 21, the additional magnetic-marking reader 22 and the indicator 32.

Having now had the benefit of the foregoing discussion of the exemplary embodiment of the position-reading system for machine-tool parts rotatable through 360°, the mode of operation of such position-reading system is hereinafter described and is as follows:

If, for example, the reading head 24 is connected or controlled to be position-reading active, then this reading head 24 reads or scans in analogous manner to the scale system according to FIG. 1, at standstill or during a rotation of the drum or cylinder 1, the signals produced by the magnetic scale 11 and transmits such generated signals to the evaluating or indicating unit 30 for evaluation and position indication.

If by a corresponding rotation of the drum or cylinder 1 a predetermined position in the proximity of the gap or joint 12 passes in front of the reading head 24, the computer 33 of the evaluating or indicating unit 30 will recognize or detect such predetermined position by virtue of the totalized or accumulated absolute value. The computer 33 now effects the change-over or switching from an input A to an input B of the detector now integrated in the computer 33 and constituted by the evaluation and switch-over means 52 and simultaneously sets the not yet defined angle of the reading head 25 which now becomes position-reading active so as to be equal to the lastly read instantaneous position value of the reading head 24 which now becomes position-reading inactive. When the gap or joint 12 approaches the reading head 25, the change-over or switching from input B back to input A is effected in analogous manner by the computer 33.

To avoid incremental signal losses and for adjusting functions, provisions are made for the use of magnetic marks or markings. Such magnetic marks or markings can be magnetized into the magnetic scale 11 or additionally mounted at the scale unit 10.

More specifically, by using two magnetic marks or markings 13 and 14 as well as the additional magnetic-marking reader 22, the accurate angle or angular position of the two magnetic marks or markings 13 and 14 can be determined by calibrating the system. Upon passage of the magnetic mark or marking 13 in front of the additional magnetic-marking reader 22, the output signal of the magnetic-marking reader 22 effects via the computer 33 the change-over or switching from the reading head 24 to the reading head 25 or, in other words, from the input A to the input B. At the same time, the computer 33 sets the instantaneous position value to be equal to the angle value of the magnetic mark or marking 13. If the rotation of the drum or cylinder 1 is continued in the same direction until the magnetic mark or marking 14 passes by the additional magnetic-marking reader 22, the computer 33 switches back to the heretofore position-reading inactive input A and simultaneously sets the still undefined angle value equal to the value of the magnetic mark or marking 14. In this manner, the reading head 24 again becomes position-reading active. Any number of rotations can thus be accomplished without impairing the accuracy of the position reading. Reversal of rotation of the drum or cylinder 1 is detected by the activated reading head and recorded in the computer 33. In the event of identical signals of both magnetic marks or markings 13 and 14, it is possible by means of the lastly read angle value to detect which one of the magnetic marks or markings 13 or 14 activates the additional magnetic-marking reader 22.

The position-reading system constructed according to the invention is as such based on known units or components, whereby the computer 33 has to be appropriately programmed in accordance with the aforesaid functions.

While there are shown and described present preferred embodiments of the invention, it is to be distinctly understood that the invention is not limited thereto, but may be otherwise variously embodied and practiced within the scope of the following claims. ACCORDINGLY,

What I claim is:

1. A position-reading system for machines having a rotatable machine part, comprising:
    a scale unit;
    said scale unit containing a gap and being arranged at said rotatable machine part;
    at least two reading units;
    said at least two reading units being arranged angularly offset by a predetermined angle with respect to each other;
    an indicating unit;
    said indicating unit containing evaluation and switch-over means;
    said at least two reading units transmitting output signals to said indicating unit;
    said indicating unit evaluating said output signals of said at least two reading units;
    said gap of said scale unit passing by at least one of said at least two reading units and defining a switch-over position;
    said indicating unit switching said at least one of said at least two reading units to become position-reading inactive and switching the other one of said at least two reading units to become position-reading active; and
    said other one of said at least two reading units taking over at said switch-over position an instantaneous position value determined by said at least one of said at least two reading units.

2. The position-reading system as defined in claim 1, further including:
    a readable marking arranged at said scale unit for determining said switch-over position.

3. The position-reading system as defined in claim 1, further including:
    at least two readable markings arranged at said scale unit for determining a region of said gap of said scale unit.

4. The position-reading system as defined in claim 3, further including:
    a marking reader provided for determining said switch-over position and for reading said at least two readable markings.

5. The position-reading system as defined in claim 4, wherein:
    said evaluation and switch-over means comprise computer means.

6. A position-reading system for machines having a rotatable machine part, comprising:
    a readable scale unit;
    said readable scale unit containing a gap and being arranged at said rotatable machine part;
    at least two reading units for reading said readable scale unit;
    said at least two reading units being arranged angularly offset by a predetermined angle with respect to each other;
    means including evaluation and switch-over means;
    said at least two reading units transmitting output signals to said means in response to reading of said readable scale unit by each of said at least two reading units when active;
    said means evaluating said output signals of said at least two reading units;
    said gap of said readable scale unit at least approaching at least one of said at least two reading units and defining a switch-over position;
    said means switching said at least one of said at least two reading units to become position-reading inactive and switching the other one of said at least two reading units to become position-reading active; and
    said other one of said at least two reading units taking over at said switch-over position an instantaneous position value determined by said at least one of said at least two reading units.

* * * * *